Nov. 22, 1960   H. HINRICHSEN ET AL   2,961,256
BALL MOUNTING FOR BALL AND SOCKET COUPLINGS
Filed July 7, 1958   2 Sheets-Sheet 1

INVENTORS
H. Hinrichsen
J. C. Knop
BY Lieber, Lieber & Nilles
ATTORNEYS.

United States Patent Office 2,961,256
Patented Nov. 22, 1960

2,961,256

BALL MOUNTING FOR BALL AND SOCKET COUPLINGS

Hans Hinrichsen, West Allis, and James C. Knop, Milwaukee, Wis., assignors to The Fulton Company, West Allis, Wis., a corporation of Wisconsin Filed July 7, 1958, Ser. No. 747,036

5 Claims. (Cl. 280—491)

The present invention relates generally to improvements in coupling assemblages for connecting trailers to draft vehicles, and it relates more specifically to an improved mounting for at least one member of a ball and socket type trailer coupling.

The primary object of this invention is to provide a mounting for attaching the ball member of a ball and socket trailer coupling to a trailer hauling vehicle in a manner whereby this member may be quickly removed from its carrying vehicle when the coupling is not in use but can be readily re-installed for subsequent use.

The use of ball and socket type couplings for detachably connecting trailers to draft vehicles such as automobiles, is very old and well known, and in most instances the ball member of such a coupling is permanently secured to the rear of the haulage vehicle while the socket member which coacts with the ball member but is removable therefrom is likewise secured to the pulling tongue or leading end of the trailer. With such coupling assemblage it is necessary in order to enable the coacting ball and socket members to swing laterally relative to each other in opposite directions so as to compensate for short turns in the path of travel, to have the ball member carried by the draft vehicle extend quite a distance rearwardly of the adjacent vehicle bumper when the coupling is in actual use.

However, when the coupling members of such assemblages are disconnected, this rearward extension of the ball member becomes a parking hazard and also mars the general appearance of the otherwise highly aesthetic vehicles. In order to prevent such undesirable rearward projection of the ball support, it has heretofore been proposed to displace and conceal the ball member beneath the bumper without actually detaching it from the draft vehicle when not in use, but such prior concealment or hiding of this member which remained suspended from the vehicle, caused the moving parts of the ball displacing mechanism to be subjected to accumulation of dirt from the road and also made it difficult to apply the same to diverse vehicles.

It is therefore also an important object of the present invention to provide an improved mounting for suspending the ball member of a universal trailer coupling from an automobile or other draft vehicle, which is durable in construction while permitting convenient bodily removal or replacement of the ball member so as to avoid such objectionable accumulation of foreign matter thereon.

Another important object of this invention is to provide an improved trailer coupling assemblage having a bodily detachable ball support, and which can be readily applied to the frames and rear bumpers of any of the well-known types of automobiles and trucks.

A further important object of the invention is to provide a simple but durable trailer hitch, the various parts of which can be produced at moderate cost from sheet metal with the aid of punches and dies, and which may also be assembled in various ways to meet diverse installation requirements.

Still another object of the present invention is to provide an improved detachable mounting for one member of a ball and socket type trailer coupling, which may be rapidly and safely secured to its carrying vehicle, and just as quickly bodily removed and protectively stored when the coupling is not being utilized.

An additional object of this invention is to provide an improved ball mounting for the couplings of automobile-drawn trailers, which is flexible in its adaptations and installation and eliminates all danger of accidental separation of the coupling members from the interconnected vehicles.

These and other more specific objects and advantages of the invention will be apparent from the following detailed description.

A clear conception of the features constituting the present improvement, and of the construction and operation of a typical commercial ball and socket coupling assemblage embodying the invention, may be had by referring to the drawings accompanying and forming a part of this specification wherein like reference characters designate the same or similar parts in the various views.

Fig. 3 is a bottom view of the ball member mounting with the parts positioned as in Fig. 1;

Fig. 4 is a front view of the same mounting with the parts also positioned as in Fig. 1;

Figure 1:
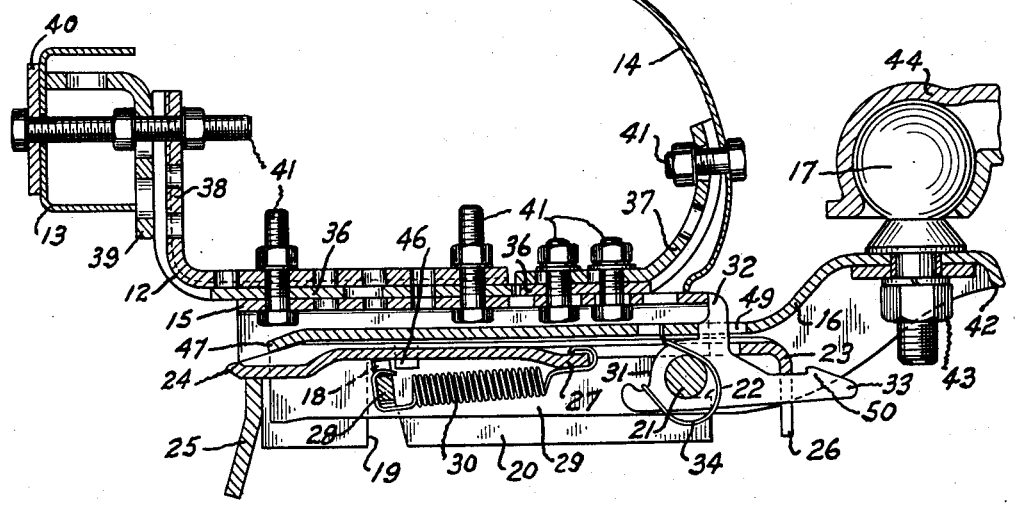
Fig. 1 is a central longitudinal vertical section through the detachable ball mounting and a fragment of the socket member of a typical ball and socket trailer coupling, showing the mounting applied to the frame and rear bumper of one type of motor vehicle and assembled for actual use, the section being taken along the line 1—1 of Fig. 3.

Figs. 5 to 8 inclusive are diagrams showing the manner in which the improved detachable ball mounting is applicable to the frames and rear bumpers of four different types of commercial automobiles; and Fig. 9 is a perspective view of one of the improved ball member mountings, showing the manner in which the ball support may be manually applied to the mounting elements and the frame and rear bumper of the type shown in Fig. 1.

While the improved detachable ball member mounting has been described and shown herein as having been applied to only a few typical arrangements of the frames and rear bumpers of well-known motor vehicles, this mounting is in fact just as readily applicable to many more types of vehicles; and it is also contemplated that specific descriptive terms employed herein be given the broadest possible interpretation consistent with the actual disclosure.

Referring to the drawings, the improved detachable coupling ball mounting assemblage shown therein, comprises in general, a framework 12 formed for attachment to the frame 13 and rear bumper 14 of various types of draft vehicles; an inverted channel 15 secured to the framework 12; an inverted channel-shaped support 16 insertible within the channel 15 and having a ball member 17 attached to its rear end and a pair of draft lugs 18 at its forward end portion cooperable with downwardly open notches 19 formed in the opposite depending side walls 20 of the channel 15 while its medial portion carries a pivot pin 21 cooperable with recesses 22 formed in the rear ends of the channel walls 20; an elongated latch bar 23 slidably confined within the ball support 16 and having its front end 24 cooperable with a transverse latch plate 25 secured to the front ends of the channel walls 20 and its rear end provided with a bifurcated handle 26 while its medial portion has a tongue 27 which is connected with a transverse brace 28 connecting the opposite side walls 29 of the support 16 by means of a pair of tension springs 30; and a safety latch 31 swingably mounted upon the pivot pin 21 and having an upright arm 32 cooperable with the rear end of the channel 15 and a horizontal arm 33 latchingly cooperable with the latch bar handle 26 under the influence of a spring 34.

Figure 2:
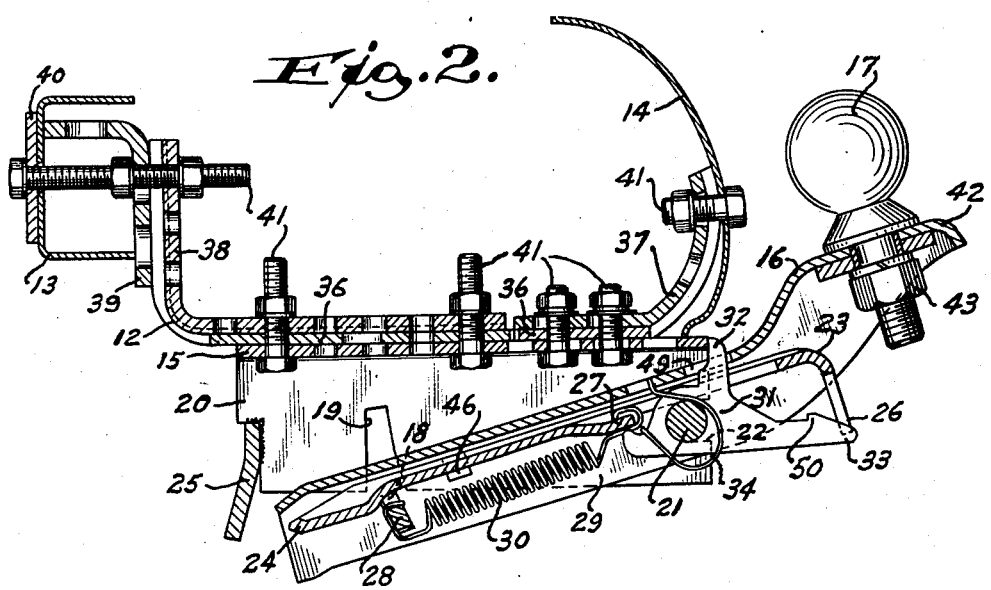
Fig. 2 is a similar section through the same coupling assemblage, but with the socket member omitted and showing the relative position of the various parts when the ball support is being removed.

The framework 12 consists primarily of several pads 36, a rear bumper attachment bracket 37 ad a frame attaching bracket 38 each having a lower recess cooperable with adjacent pads 36, an angle bracket 39, and one or more clamping plates 40, all formed of heavy sheet metal, and provided with holes or slots for the reception of assembly bolts 41 of diverse lengths. These framework elements may be adjustably assembled in various ways so that the assemblage will properly coact with and may be firmly clamped by the bolts 41 to the vehicle frame 13 and bumper 14 of different types of vehicles, and also to the ball mounting channel 15, as shown in detail in Figs. 1 and 2, and diagrammatically in Figs. 5 to 8 inclusive. The inverted channel 15 may also be formed of durable sheet metal, and the latch plate 25 may be welded or otherwise firmly attached to and across the front end of this channel and is preferably inclined upwardly and rearwardly as depicted in Figs. 1 and 2.

The inverted channel-shaped ball support 16 is likewise formed of sturdy sheet metal, and has an elevated and reinforced platform 42 formed integral with its rear end, to which the ball member 17 is rigidly attached by a clamping nut 43 and a lock washer. When the coupling is in use, this ball member 16 is engaged for universal relative movement by a socket member 44 in a well-known manner, and as illustrated in Fig. 1. The pivot pin 21 is firmly attached as by welding, to the opposite side walls 29 of the support 16, and the protruding ends of this pin coact with the recesses in the channel 15 to carry the load when the draft vehicle is backing up a trailer. The brace 28 which spans the space between the side walls 29 of the support 16 may also be welded or otherwise firmly attached to these walls, and the draft lugs 18 which are engageable with the notches 19 in the channel walls 20 may either be formed as extensions of the brace ends or as separate elements firmly attached to the walls 29 of the ball support. It is noteworthy that when the ball member 17 is in active position, both the ball and its supporting platform are disposed and extend a considerable distance rearwardly of the vehicle bumper 14.

The latch bar 23 which is slidable within the ball support 16 is also formed of durable sheet metal, and is provided with integral guiding lugs 46 at its opposite sides which are slidably cooperable with the adjacent ball support flanges 29 to prevent lateral displacement of the bar 23, and which also coact with the brace 28 to limit the forward travel of this bar. The latch bar 23 is moreover prevented from dropping out of the channel-shaped support 16 by the pivot pin 21 which is firmly attached to the support walls, and the medial portion of the front end 24 of this bar is curved upwardly as shown in Figs. 1 and 2 for proper latching cooperation with the plate 25. The opposite side portions of this bar end 24 are inclined rearwardly and upwardly at a slight angle for wedging cooperation with a forwardly and downwardly inclined front end ledge 47 on the ball support 16, and this specific construction of the latch bar 23 and of the associated parts of the support 16 is of utmost importance in obtaining effective and safe latching attachment of the ball member 17 to the vehicle.

While the tension springs 30 which constantly urge the latch bar 23 toward latching position, normally suffice to prevent the ball member 17 from becoming detached, the safety latch 31 may also be provided as a precautionary measure, but the safety latch functions only after the ball mounting has been fully assembled. This latch 31 which is likewise formed of sheet metal, is rotatably mounted upon the pivot pin 21 and is constantly urged into latching position by the torsion spring 34. The upper latch arm 32 extends through an opening 49 in the ball support 16 while the lower arm 33 extends through the bifurcation of the latch handle 26 and has a latching projection 50 cooperable with this handle to prevent rearward movement of the latch bar 23 sufficient to release the bar end 24 from the fixed retainer plate 25. The arm 33 of the latch 31 however provides a manipulating handle which when depressed permits the latch bar 23 to be moved rearwardly and detached from the latch plate 25 of the channel 15.

The improved trailer hitch may obviously be applied to various types of vehicles in the manner depicted in the diagrams of Figs. 5 to 8 inclusive, by merely drilling holes in the mid-portions of the frame 13 and bumper 14 and thereafter assembling the framework 12 and inverted channel 15 and by firmly attaching these fixed ball member mounting elements to the vehicle and to each other with the aid of bolts 41 of selected lengths. After proper initial installation of these mounting elements of the assemblage, the ball support 16 with the ball member 17 and the latch bar 23 and latch 31 applied thereto, may be quickly attached to the channel 15 in the manner illustrated in Fig. 9, by gripping the ball member 17 and inserting the opposite protruding ends of the pivot pin 21 carried by the support 16 within the notches 22 formed in the side walls 20 of the channel 15, and by thereafter swinging the front end of the support 16 upwardly about the pivot pin 21. The latch bar end 24 will then ride along the latch plate 25 and will be moved rearwardly to stretch the springs 30, until the bar end 24 has passed the upper edge of the plate 25 whereupon the springs 30 will automatically move the latch bar 23 forwardly with a snap action and will cause the bar end 24 to assume the position shown in Fig. 1 wherein the support 16 is locked to the channel 15.

While the ball member support 16 is being thus applied to the mounting channel 15, the latch bar handle 26 will ride over the latch projection 50 of the latch arm 33 and the latch 31 will thereafter function as an aid to the springs 30 in maintaining the latch bar 23 in locking position and the ball member 17 in proper position for use. The socket member 44 after having been properly attached to the trailer may then be applied to or removed from the ball member 17 in a well-known manner for normal use, and when it is no longer desired to utilize the trailer coupling, the ball member 17 and its support 16 may be quickly removed as a unit, by merely reaching beneath the platform 42, depressing the latch arm 33, and by utilizing the latch handle 26 to retract the latch bar 23 sufficiently to withdraw the latch end 24 rearwardly beyond the upper edge of the plate 25. The ball suspension unit may then be swung about the axis of the pivot pin 21 as in Fig. 2, whereupon the pivot pin ends may be withdrawn from the recesses 22 and the ball unit including the support 16, latch bar 23 and latch 31 may be freely rearwardly removed.

From the foregoing detailed description of the construction and operation of the device, it should be apparent that the invention in fact provides an improved mounting for ball and socket trailer couplings, wherein at least the coupling member which is carried by the draft vehicle can be quickly and conveniently bodily removed from or connected to the vehicle in order to provide maximum parking clearance when the coupling is not in use. In order to prevent excessive play following prolonged use of the coupling member mounting assemblage, the proper formation of the latch bar end 24 and of the support end 47 is very important in order to permit easy manipulation of the latch, and the angularity of the opposite inclined side portions of the latch bar end 24 relative to the horizontal must be either slightly greater or less than that of the corresponding lower inclined surface of the support end 47 so that the latch bar 23 cannot become jammed between the upper surface of the plate 25 and the lower surface of the top wall of the support 16 when the coupling is subjected to shock load.

All of the major parts of the ball mounting may be accurately formed of durable sheet metal with the aid of punches and dies, and may be conveniently assembled to cooperate with vehicles having bumpers 14 and frames 13 of different types and spacings or relative locations. When the coupling members 16, 17 have been removed, none of the coupling mounting elements are normally visible or subject to dust accumulation and such removal and reinstallation can obviously be quickly and conveniently effected. While the latch bar 23 alone will positively prevent separation of the member 17 from the draft vehicle, the latch 31 provides a safety device for preventing such accidental separation. The improved assemblage has proven highly satisfactory and successful in actual use, and can be manufactured and sold at moderate cost for application to diverse types of automobiles.

It should be understood that it is not desired to limit this invention to the exact details of construction and operation herein specifically shown and described, for various modifications within the scope of the appended claims may occur to persons skilled in the art.

We claim:

1. A detachable mounting for the ball of a ball and socket trailer coupling wherein the ball is normally carried by a draft vehicle while the socket is attached to a trailer, said mounting comprising, an elongated inverted channel element formed for fixed suspension from a draft vehicle and having a rear end recess and a front end member transversely spanning the front end of the element and provided with an upwardly and rearwardly inclined transverse surface, an elongated ball support having a pin pivotally cooperable with said recess and being swingable about said pin upwardly within said channel element into trailer hauling position, an elongated latch bar slidable along said support and having its front end projectable beyond the front end of the support and engageable with said inclined surface to move the bar rearwardly when the support is swung into trailer hauling position, and resilient means for urging said latch bar end forwardly into latching engagement with said front end member of said element whenever said support has been swung into trailer hauling position.

2. A detachable mounting for the ball of a ball and socket trailer coupling wherein the ball is normally carried by a draft vehicle while the socket is attached to a trailer, said mounting comprising, an elongated inverted channel formed for fixed attachment to a draft vehicle and having depending side walls provided with alined rear end rearwardly open recesses and with a front end member connecting said walls and having an upwardly and rearwardly inclined surface facing said recesses while the medial portions of said walls have downwardly open notches therein, an elongated inverted channel shaped ball support having depending side walls provided with pins insertible forwardly within and pivotally cooperable with said recesses and also provided with draft lugs engageable with said notches when said support is swung about the pins into trailer hauling position, an elongated latch bar carried by and slidable along said support and having its front end movable forwardly beyond the adjacent end of the support and engageable with said inclined surface to retract the bar rearwardly when the support is swung into trailer hauling position, and spring means for urging said latch bar and forwardly into latching engagement with said front end member of said channel whenever said support has been swung into trailer hauling position.

3. A detachable mounting for the ball of a ball and socket trailer coupling wherein the ball is normally carried by a draft vehicle while the socket is attached to a trailer, said mounting comprising, an elongated element formed for fixed attachment to a draft vehicle and having depending spaced side walls provided with rear end recesses and interconnected by a front end transverse member while the intermediate portions of the walls have downwardly open notches therein, an elongated ball support having pins insertible within and pivotally cooperable with said recesses and also having a downwardly and rearwardly inclined upper rear end portion and being provided with draft lugs cooperable with said element notches when the mounting is assembled for use, an elongated latch bar carried by and slidable along said support and having its front end projectable forwardly beyond the adjacent end of the support over the top of said transverse member when said support is swung about said pins into trailer hauling position, the front end of said latch bar also being provided with a downwardly and rearwardly upper inclined rear end surface cooperable with said inclined support portion to force this latch bar end into snug engagement with said member top when said bar is projected forwardly thereover, and means for resiliently urging said latch bar forwardly relative to said support.

4. A detachable mounting for the ball of a ball and socket trailer coupling wherein the ball is normally carried by a draft vehicle while the socket is attached to a trailer, said mounting comprising, an elongated element formed for fixed attachment to a draft vehicle and having depending spaced side walls provided with rear end recesses and interconnected by a front end transverse member while the intermediate portions of the walls have downwardly open notches therein, an elongated ball support having pins insertible within and pivotally cooperable with said recesses and also having a downwardly and rearwardly inclined upper rear end portion and being provided with draft lugs cooperable with said element notches when the mounting is assembled for use, an elongated latch bar carried by and slidable along said support and having its front end projectable forwardly beyond the adjacent end of the support over the top of said transverse member when said support is swung about said pins into trailer hauling position, the front end of said latch bar also being provided with a downwardly and rearwardly upper inclined rear end surface cooperable with said inclined support portion to force this latch bar end into snug engagement with said member top when said bar is projected forwardly thereover, means for resiliently urging said latch bar forwardly relative to said support, and a safety latch swingably suspended from said support coaxially of said pins and being cooperable with said element and with said latch bar to prevent rearward displacement of the front latch bar and out of engagement with said member when the mounting has been fully assembled for use.

5. A detachable mounting for the ball of a ball and socket trailer coupling wherein the ball is normally carried by a draft vehicle while the socket is attached to a trailer, said mounting comprising, an elongated element formed for fixed suspension from a draft vehicle and having a rear end recess and a front end member provided with an upwardly and rearwardly inclined transverse surface, an elongated ball support having a pin pivotally cooperable with said recess and being swingable about said pin into trailer hauling position, an elongated latch bar slidable along said support and having its front end projectable beyond the front end of the support and engageable with said inclined surface to move the bar rearwardly when the support is swung into trailer hauling position, resilient means for urging said latch bar end forwardly into latching engagement with said front end member of said element whenever said support has been swung into trailer hauling position, and a safety latch swingable about the axis of said pin and being cooperable with said element and with said latch bar to maintain the latter in latching position when the mounting has been fully assembled for use.

References Cited in the file of this patent

UNITED STATES PATENTS

| | | |
|---|---|---|
| 2,484,751 | Schultz | Oct. 11, 1949 |
| 2,622,892 | Lowman | Dec. 23, 1952 |
| 2,685,457 | Van Zee | Aug. 3, 1954 |
| 2,877,025 | Jay | Mar. 10, 1959 |